United States Patent
Thomas et al.

(10) Patent No.: US 10,911,280 B2
(45) Date of Patent: Feb. 2, 2021

(54) METHOD FOR ADAPTING THE LENGTH OF NULL CYCLIC PREFIX FOR A FREQUENCY-DOMAIN NULL CYCLIC PREFIX SINGLE CARRIER COMMUNICATION SYSTEM

(71) Applicant: Nokia Technologies Oy, Espoo (FI)

(72) Inventors: Timothy Thomas, Au Train, MI (US); Frederick Vook, Schaumburg, IL (US); Mark Cudak, Rolling Meadows, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/337,533

(22) PCT Filed: Sep. 28, 2017

(86) PCT No.: PCT/FI2017/050684
§ 371 (c)(1),
(2) Date: Mar. 28, 2019

(87) PCT Pub. No.: WO2018/060558
PCT Pub. Date: Apr. 5, 2018

(65) Prior Publication Data
US 2019/0229963 A1    Jul. 25, 2019

Related U.S. Application Data

(60) Provisional application No. 62/402,191, filed on Sep. 30, 2016.

(51) Int. Cl.
*H04L 27/26* (2006.01)
*H04B 7/06* (2006.01)
*H04B 7/0452* (2017.01)

(52) U.S. Cl.
CPC ....... *H04L 27/2607* (2013.01); *H04B 7/0617* (2013.01); *H04L 27/2605* (2013.01);
(Continued)

(58) Field of Classification Search
CPC ............ H04L 27/2607; H04L 27/2636; H04L 27/2646; H04L 27/2605; H04L 27/2628; H04B 7/0617; H04B 7/0452
See application file for complete search history.

(56) References Cited

U.S. PATENT DOCUMENTS 8,559,990 B2 * 10/2013 Jiang .................... H04B 7/0617
455/500
8,787,260 B2 * 7/2014 Ban ........................ H04W 8/26
370/328
(Continued)

OTHER PUBLICATIONS

Berardinelli, Gilberto, et al., "On the potential of OFDM enhancements as 5G waveforms", 2014 IEEE 79th Vehicular Technology Conference, (VTC 2014—Spring), Seoul, Korea, May 18-21, 2014, 5 pgs.
(Continued)

*Primary Examiner* — Chi H Pham
*Assistant Examiner* — Ji-Hae Yea
(74) *Attorney, Agent, or Firm* — Harrington & Smith

(57) ABSTRACT

A method is provided including determining, for each of a plurality of user equipments, a null cyclic prefix length for communication in a wireless network using null cyclic prefix single-carrier modulation; and communicating with at least one of the user equipments based at least partially on the determined null cyclic prefix length of the at least one user equipment.

19 Claims, 5 Drawing Sheets

(52) U.S. Cl.
CPC ...... *H04L 27/2628* (2013.01); *H04L 27/2636* (2013.01); *H04L 27/2646* (2013.01); *H04B 7/0452* (2013.01)

(56) References Cited

U.S. PATENT DOCUMENTS

| | | | | |
|---|---|---|---|---|
| 8,792,369 | B2* | 7/2014 | Alanara | H04L 27/2607 |
| | | | | 370/252 |
| 9,084,193 | B2* | 7/2015 | Yamamoto | H04W 56/002 |
| 9,419,836 | B2* | 8/2016 | Chmiel | H04W 72/042 |
| 2011/0149771 | A1* | 6/2011 | Abeta | H04L 27/2607 |
| | | | | 370/252 |
| 2013/0022090 | A1* | 1/2013 | Weng | H04L 25/03343 |
| | | | | 375/219 |
| 2015/0201368 | A1* | 7/2015 | Cudak | H04W 72/0413 |
| | | | | 370/329 |

OTHER PUBLICATIONS

Berardinelli, Gilberto, et al., "Zero-tail DFT-spread-OFDM signals", 2013 IEEE Globecom Workshops, Dec. 9, 2013, 6 pgs.

\* cited by examiner

600: determining, for each of a plurality of user equipments, a null cyclic prefix length for communication in a wireless network using null cyclic prefix single-carrier modulation

602: communicating with at least one of the user equipments based at least partially on the determined null cyclic prefix length of the at least one user equipment

FIG. 6

700: determining, by a user equipment, a null cyclic prefix length for communication in a wireless network utilizing null cyclic prefix single-carrier modulation

702: communicating with an access point of the wireless network, based at least partially on the determined null cyclic prefix length of the at least one user equipment

METHOD FOR ADAPTING THE LENGTH OF NULL CYCLIC PREFIX FOR A FREQUENCY-DOMAIN NULL CYCLIC PREFIX SINGLE CARRIER COMMUNICATION SYSTEM

CROSS REFERENCE TO RELATED APPLICATION

This patent application is a U.S. National Stage application of International Patent Application Number PCT/FI2017/050684 filed Sep. 28, 2017, which is hereby incorporated by reference in its entirety, and claims priority to U.S. provisional application 62/402,191 filed Sep. 30, 2016, which is hereby incorporated by reference in its entirety.

TECHNICAL FIELD

This invention relates generally to wireless networks and, more specifically, relates to the operation of frequency-domain single carrier (SC) for 5G above 40 GHz.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

There are several factors which will make systems above 40 GHz unique and they are predominately the result of the higher bandwidth (BW) and also increased severity of hardware impairments seen as the frequency goes beyond 40 GHz. In particular, the analog to digital converters (ADCs) and digital to analog converters (DACs) will consume significantly more power at the higher BWs making fully digital array solutions infeasible at least in the near term until hardware efficiency is substantially improved. The increased power consumption of the ADCs and DACs along with the need for larger antenna arrays to overcome the higher path loss of these frequencies, drives the use of analog electrically steered arrays, (AESAs). These arrays require only one baseband unit per AESA and hence the number of ADCs and DACs would be minimized. It is expected that initial 5G systems above 40 GHz will employ just two AESAs with orthogonal polarizations at both the access point (AP) and user equipment (UE) where the polarizations are used to obtain dual stream transmission even in line-of-sight (LOS) channels. The use of AESAs will make multiplexing of users in frequency difficult as the users would need to share the same beam. Hence, one of the major advantages of orthogonal frequency division multiplexing (OFDM), the flexibility to schedule users in the frequency domain, is no longer applicable. Also, the use of large arrays cause the final beamformed channels to be very Ricean in nature which mitigates much of the advantage of maximum likelihood (ML) equalization of OFDM over the frequency-domain minimum mean squared error (MMSE) equalization of cyclic-prefix (CP) single carrier (SC). Finally, OFDM employs standard CPs which are non-zero symbols and there are some significant advantages of moving to null CPs (NCPs).

BRIEF SUMMARY

This section is intended to include examples and is not intended to be limiting.

In an example of an embodiment, a method is disclosed that includes determining, for each of a plurality of user equipments, a null cyclic prefix length for communication in a wireless network using null cyclic prefix single-carrier modulation; and communicating with at least one of the user equipments based at least partially on the determined null cyclic prefix length of the at least one user equipment.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In an example of an embodiment, an apparatus is disclosed that includes means for determining, for each of a plurality of user equipments, a null cyclic prefix length for communication in a wireless network using null cyclic prefix single-carrier modulation; and means for communicating with at least one of the user equipments based at least partially on the determined null cyclic prefix length of the at least one user equipment.

In an example of an embodiment, a method is disclosed that includes determining, by a user equipment, a null cyclic prefix length to be used for communication in a wireless network utilizing null cyclic prefix single-carrier modulation; and communicating, by the user equipment, with an access point of the wireless network based at least partially on the determined null cyclic prefix length.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In another example of an embodiment, an apparatus comprises means for means for determining, by a user equipment, a null cyclic prefix length to be used for communication in a wireless network utilizing null cyclic prefix single-carrier modulation; and means for communicating, by the user equipment, with an access point of the wireless network based at least partially on the determined null cyclic prefix length.

BRIEF DESCRIPTION OF THE DRAWINGS

In the attached Drawing Figures:

FIGS. 6 and 7 are logic flow diagrams for method for adapting the null cyclic prefix for a frequency-domain null single carrier communication system, and illustrate the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

For the purposes of this description, the terms 'Access Point' (AP) and 'base station' (BS) may be used interchangeably.

The exemplary embodiments herein describe techniques for adapting the null cyclic prefix for a frequency-domain null single carrier communication system. Additional description of these techniques is presented after a system into which the exemplary embodiments may be used is described.

Figure 1:
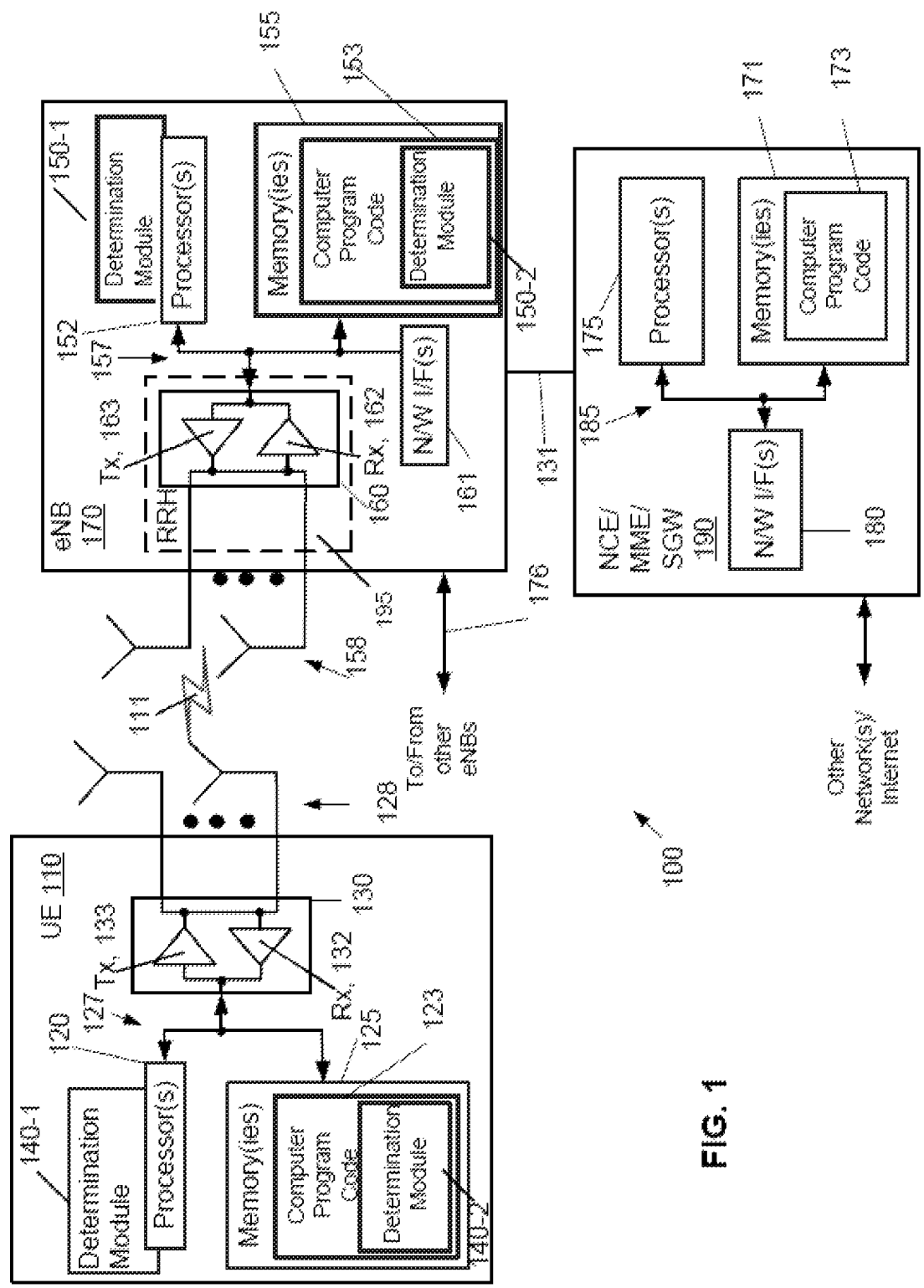
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a determination module, comprising one of or both parts 140-1 and/or 140-2, which may be implemented in a number of ways. The determination module may be implemented in hardware as determination module 140-1, such as being implemented as part of the one or more processors 120. The determination module 140-1 may be implemented also as an integrated circuit or through other hardware such as a programmable gate array. In another example, the determination module may be implemented as determination module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a determination module, comprising one of or both parts 150-1 and/or 150-2, which may be implemented in a number of ways. The determination module may be implemented in hardware as determination module 150-1, such as being implemented as part of the one or more processors 152. The determination module 150-1 may be implemented also as an integrated circuit or through other hardware such as a programmable gate array. In another example, the determination module may be implemented as determination module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell may correspond to a single carrier and an eNB may use multiple carriers. So if there are three 120 degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Example implementations relate to techniques for adapting the null cyclic prefix (NCP) on a per-user basis in both the transmitter (Tx) and receiver (Rx) of the NCP-SC communication system. NCP-SC is characterized by the use of null (zero) symbols in place of a regular CP. An advantage of this type of CP is that the NCP can be adapted per-user without changing the overall frame timing since the NCP is part of the block of N symbols which are inverse fast Fourier transformed (IFFT'd) by the transmitter (i.e. the NCP is not an add-on to the N symbols which are IFFT'd by the transmitter like in OFDM). Hence, the NCP can be optimized for each user's link separately, thus minimizing the overhead compared to systems where the CP length is set by the worst delay expected by most links.

Figure 2:
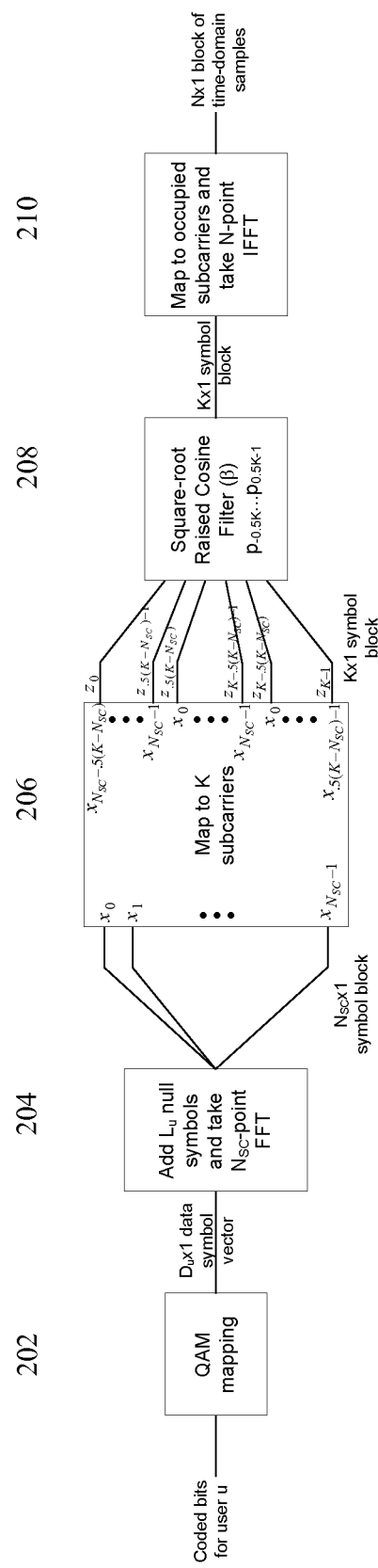
FIG. 2 is an example frequency-domain Tx implementation of NCP-SC in accordance with exemplary embodiments.

Referring now to FIG. 2, this figure shows an example frequency-domain Tx implementation of NCP-SC which facilitates adapting the NCP on a per-user basis without changing the overall frame timing. In the example shown in FIG. 2, it is assumed that a given slot time, t, is destined for at most a single user. The time slot destined for a user u is denoted $t_u$. The coded bits for user u are mapped to QAM symbols as shown at 202, which are grouped into sets of size $D_u$. These $D_u$ symbols for time slot $t_u$ can be designated as $v_0(t_u)$ through $v_{D_u-1}(t_u)$ and can be expressed in the following vector:

$$v_{t_u} = \begin{bmatrix} v_0(t_u) \\ v_1(t_u) \\ \vdots \\ v_{D_u-1}(t_u) \end{bmatrix}$$

Next, $L_u$ zeros are appended to the $D_u$ data symbols to create a block of $N_{SC}$ pre-FFT symbols ($x'_0(t_u)$ through $x'_{N_{SC}-1}(t_u)$) where $N_{SC}$ is the SC spreading size as shown at 204. This block of $N_{SC}$ pre-FFT symbols is the NCP-SC slot at slot time $t_u$, and $N_{SC}=D_u+L_u$. The $L_u$ zeros can be appended in a variety of ways, for example as a post-fix:

$$x_{t_u} = \begin{bmatrix} x'_0(t_u) \\ x'_1(t_u) \\ \vdots \\ x'_{N_{SC}-1}(t_u) \end{bmatrix} = \begin{bmatrix} v_0(t_u) \\ \vdots \\ v_{D_u-1}(t_u) \\ 0_{L_u} \end{bmatrix}$$

where $0_n$ is a n×1 vector of all zeros, or as a split pre-fix/post-fix (assuming here for simplicity that $L_u$ is even):

$$x_{t_u} = \begin{bmatrix} x'_0(t_u) \\ x'_1(t_u) \\ \vdots \\ x'_{N_{SC}-1}(t_u) \end{bmatrix} = \begin{bmatrix} 0_{0.5L_u} \\ v_0(t_u) \\ \vdots \\ v_{D_u-1}(t_u) \\ 0_{0.5L_u} \end{bmatrix}.$$

Next a length $N_{SC}$ FFT is taken of the $N_{SC}$ pre-FFT symbols to create a block of $N_{SC}$ symbols, $x_0$ through $x_{N_{SC}-1}$, as follows:

$$x_k = \frac{1}{\sqrt{N_{SC}}} \sum_{n=0}^{N_{SC}-1} x'_n e^{-j2\pi kn/N_{SC}}$$

Next, the block of $N_{SC}$ symbols, $x_0$ through $x_{N_{SC}-1}$, is mapped to K (K≥$N_{SC}$) occupied subcarriers as shown in 206 to create a block of K pre-filtered symbols, $z_0$ through $z_{K-1}$. Next in 208 the block of K pre-filtered symbols are multiplied by a frequency filter, $p_{-0.5K}$ through $p_{0.5K-1}$, to create a K×1 block of filtered symbols, $a_0$ through $a_{K-1}$ where $a_m = z_m p_{m-0.5K}$. One option for the frequency filter is the square-root raised cosine (SRRC) filter given as:

$$p_k = \begin{cases} 1 & |k/N_{SC}| \leq 0.5(1-\beta) \\ \sqrt{0.5\left\{1+\cos\left[\frac{\pi}{\beta}\left(\frac{|k/N_{SC}|-}{0.5(1-\beta)}\right)\right]\right\}} & 0.5(1-\beta) < |k/N_{SC}| \leq 0.5(1+\beta) \\ 0 & \text{otherwise} \end{cases}$$

where k goes from −0.5K to 0.5K−1 and β is the roll-off factor of the filter and is a function of $N_{SC}$ and K:

$$\beta = \frac{K}{N_{SC}} - 1.$$

Then, at 210, the K×1 block of filtered symbols is mapped to occupied subcarriers and an N-point IFFT is taken to create the N×1 block of time-domain samples on slot $t_u$, $g_0$ through $g_{N-1}$. This procedure can be expressed as:

$$g_n = \frac{1}{\sqrt{N_{SC}}} \sum_{k=0}^{K-1} a_k e^{j2\pi(k-0.5K)n/N}$$

Figure 3:
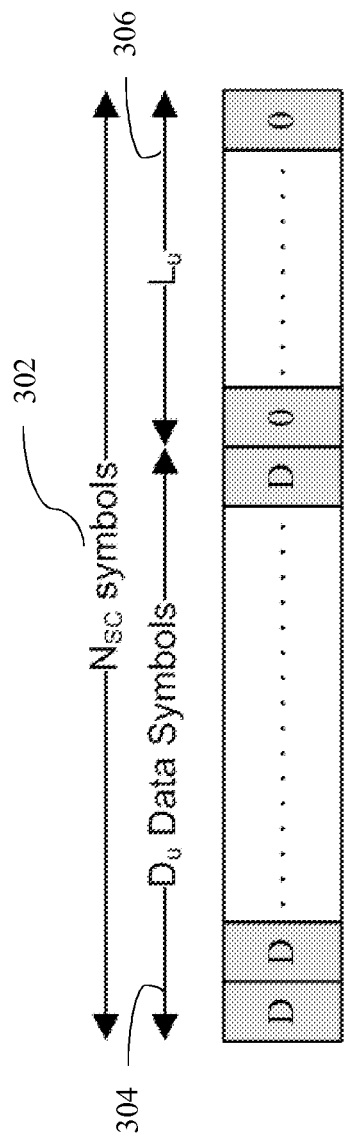
FIG. 3 is an example NCP-SC time slot in accordance with exemplary embodiments.

Referring also to FIG. 3, this figure shows an NCP-SC time slot in accordance with exemplary embodiment. The NCP-SC time slot corresponds with the block of $N_{SC}$ pre-FFT symbols created at block 204 of FIG. 2 as described above. The block of $N_{SC}$ pre-FFT symbols 302 shown in FIG. 2 comprises $L_u$ zeros 306 which have been added to the $D_u$ data symbols 304. As can be seen, $D_u = N_{SC} - L_u$ according to exemplary embodiments. It is this time slot which makes up a NCP-SC frame (and subframe) and hence the frame (and subframe) length is only a function of $N_{SC}$, not $L_u$. Note that $N_{SC}$ remains the same regardless of the size of $L_u$ (assuming $L_u$ is less than $N_{SC}$) and that $D_u = N_{SC} - L_u$.

Figure 4:
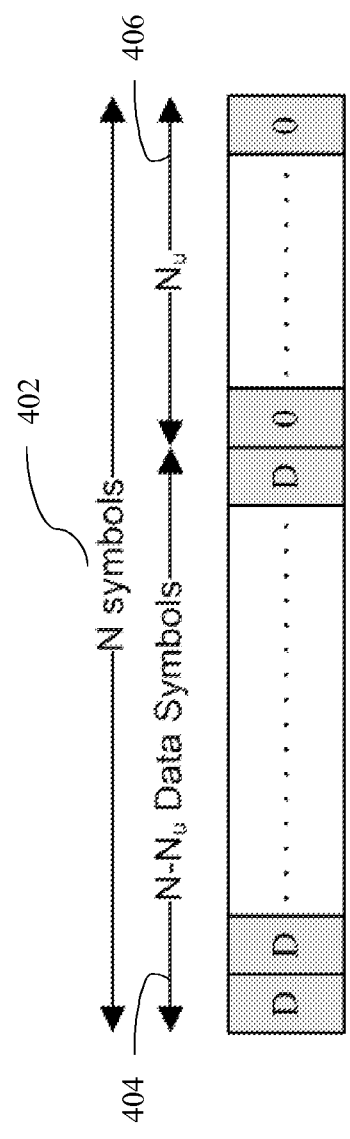
FIG. 4 is an example NCP-SC time-domain waveform in accordance with exemplary embodiments.

Referring also to FIG. 4, this figure shows an example NCP-SC time-domain waveform at the output of a Tx corresponding to the example implementation shown in FIG. 2 (i.e., $g_0$ through $g_{N-1}$ as described above). In FIG. 4, the NCP-SC time-domain waveform includes N symbols 402. The N symbols 402 comprise N−$N_u$ data symbols 404 and $N_u$ zeros 406. In FIG. 4, "D" indicates the data portion, and is not the same as "D" as in FIG. 3, since it is effectively an over-sampled and filtered version of FIG. 3. The number of samples in the NCP-SC time-domain waveform is always N regardless of the number of null symbols for user u in the NCP-SC slot. $L_u$ is chosen so that the resulting length of the zeros ($N_u$) in the final time-domain waveform shown in FIG. 4 matches the desired length for the given user. The resulting block of time-domain samples has the structure shown in FIG. 4 where $N_u$ of these samples represents the actual transmitted CP for user u. Further details on selecting $N_u$ and $L_u$ are provided below.

Figure 5:
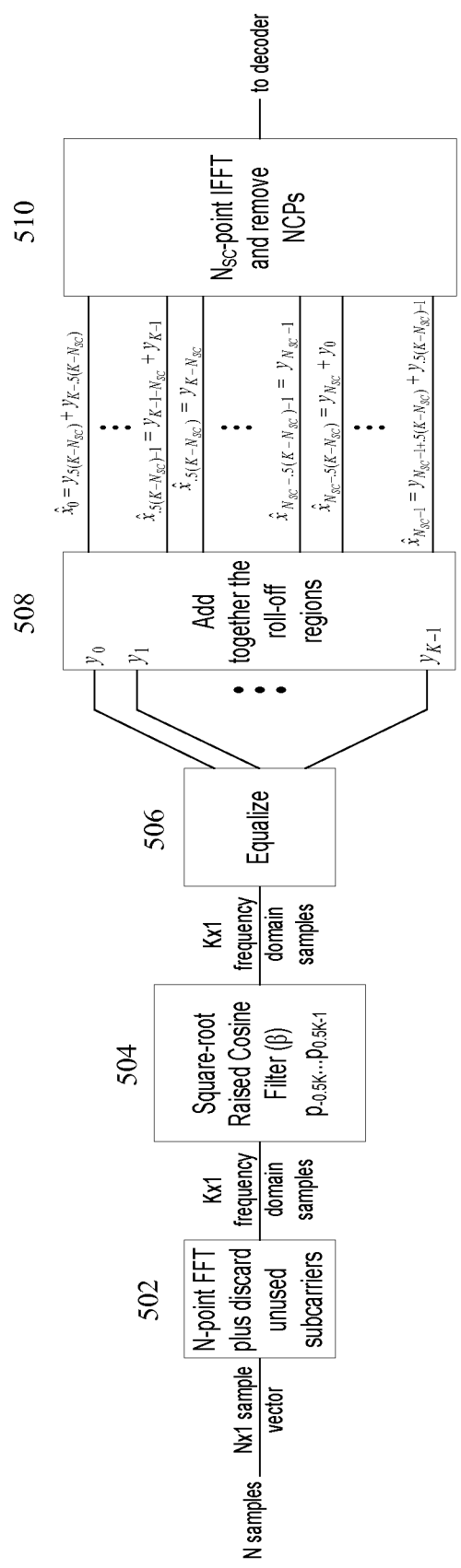
FIG. 5 is an example frequency-domain Rx implementation of NCP-SC in accordance with exemplary embodiments.

Referring now to FIG. 5, this figure shows the frequency-domain Rx implementation of NCP-SC according to exemplary embodiments. The receiver is assumed to have timing synchronization with the transmitter so that it knows where the beginning of NCP-SC time slot for user u, $t_u$, begins. Let the N received samples for NCP-SC time slot $t_u$ be given as $q_0$ through $q_{N-1}$. At 502, the receiver performs an N-point FFT on the N received samples and discards unused subcarriers to obtain K frequency domain samples, $Q_0$ through $Q_{K-1}$. In equation form these two operations can be expressed as:

$$Q_k = \frac{1}{\sqrt{N_{SC}}} \sum_{n=0}^{N-1} q_n e^{-j2\pi(k-0.5K)n/N}$$

where k goes from 0 to K−1.

The K frequency domain samples are multiplied by a frequency-domain pulse shape, $p_k$, for example, using a square-root raised cosine (SRRC) filter (β) as shown at 504 and as given above to generate K filtered samples, $r_0$ through $r_{K-1}$. In particular, $r_k = Q_k p_{k-0.5K}$. Then these K filtered samples are equalized at 506 to create equalized samples $y_0$ through $y_{K-1}$. In particular $y_k = w_k r_k$ where $w_k$ is the equalizer coefficient on subcarrier k and may be chosen as the minimum mean squared error (MMSE) equalizer as is known in the art. At block 508, the roll-off regions are added together as shown to create a block of $N_{SC}$ symbol estimates, $\hat{x}_0$ through $\hat{x}_{N_{SC}-1}$ which should be estimates of the $N_{SC}$ symbols $x_0$ through $x_{N_{SC}-1}$ sent from the transmitter. Next at 510 a $N_{SC}$-point IFFT is taken of the block of $N_{SC}$ symbol estimates to get a block of $N_{SC}$ de-spread symbol estimates, $s_0$ through $s_{N_{SC}-1}$, as:

$$s_n = \frac{1}{\sqrt{N_{SC}}} \sum_{n=0}^{N-1} \hat{x}_k e^{j2\pi k n/N_{SC}}$$

Next the appropriate number of null symbols, $L_u$ are discarded from the block of $N_{SC}$ de-spread symbol estimates to recover the $D_u$ data symbol estimates, $\hat{v}_0$ through $\hat{v}_{D_u-1}$ which should be estimates of $v_0$ through $v_{D_u-1}$ sent from the transmitter. For example if a null postfix is used as described above, $\hat{v}_k = s_k$ for k=0 through $D_u - 1$. The $D_u$ data symbol estimates can be next fed to the decoder to recover the transmitted coded bits for user u on slot $t_u$.

As can be seen from FIG. 5, the Rx implementation is easily adaptable to different NCP lengths by simply discarding the appropriate number of null symbols, $L_u$, assuming the Rx knows the NCP length. This may also influence coding aspects like rate matching as the number of data symbols changes with the NCP length.

Techniques for signaling to adapt Nu/Lu on a per-user basis and for how an AP or UE determines the optimal NCP length of the cyclic prefix for a given user are now described.

According to an embodiment, an AP determines the optimal NCP length based on a channel estimate obtained with uplink sounding or with an uplink transmission. Since beamforming will be an integral part of 5G mmWave systems, it is important that the UE transmits and the AP listens to which beams are used for the data transmission in order to determine the optimal NCP length. This is because beamforming will make the channel be more Rician in nature which will tend to mean a smaller NCP length is needed. If a transmission with beamforming is not possible, such as during the early stages of a UE entering the system, either a default NCP length may be used or a NCP length may be predicted based on an expected beamforming gain.

According to some embodiments, a UE may determine the NCP length in a similar manner as the AP, except the UE could use either a downlink transmission or downlink reference signals, preferably using dedicated reference signals as they could be beamformed.

In either case, the significant delay spread of the channel may be determined from the channel estimates and the significant delay spread may be used to determine the optimal NCP length. Other factors may play a role as well, such as, predicted SNR after equalization and the modulation and coding rate used for example. If post-equalized SNR is low, then it is likely that a low modulation and coding rate is used and the receiver then may be less sensitive to the NCP length, and therefore likely could tolerate a much smaller NCP length than the channel would dictate. If the post-equalized SNR is high, then it is likely that a higher order modulation and coding rate is used and hence it more imperative to have the NCP cover the dominant delay spread of the channel.

In some embodiments, a method of rate matching needs to be employed as the amount of data symbols decreases as the NCP length increases and vice versa. If some coding methods (e.g., LDPC) constrain the number of possible data lengths, then the set of choices for the NCP length could be limited.

In some embodiments, an AP may determine the appropriate NCP length for a given UE, and through downlink control signaling the AP may signal the NCP length to be used on the downlink to and uplink from the particular UE.

According to some embodiments, a UE may determine the appropriate NCP length and through uplink control signaling signal the desired NCP length to the AP. This NCP length would be used on both uplink and downlink transmissions for that UE. In other embodiments, instead of the AP explicitly signaling which NCP length was used in a downlink control message, the UE may assume that the AP will use that NCP length unless signaled otherwise.

In some embodiments, the NCP length for user-specific control may employ the same NCP length as the data portion if the UE knows beforehand what the NCP length is (e.g., the UE determined it and has already signaled it back). Otherwise, the NCP for the control would need to be some default value or could be the value used for the last transmission to or reception from the UE.

In some embodiments, the NCP length may be fixed at some value for all transmissions through a broadcast control message (i.e., a broadcast message specifying the NCP length would disable adaptive NCP length control for that AP).

In some embodiments, the NCP length may not be explicitly signaled, but rather the AP or UE may detect the NCP length by estimating the number of zeros in the equalized symbols. For example, the AP could determine the best NCP length from an uplink transmission and just start using that length in the downlink without any explicit signaling. The UE would then determine the NCP length after equalization by estimating the number of null symbols (e.g., in the block of $N_{SC}$ de-spread symbol estimates as shown at 510 of FIG. 5).

In some embodiments, the UE may determine the best NCP length from a downlink signal and just start using that NCP length in the uplink without any explicit signaling. The AP would estimate the NCP length after equalization at the receiver. At low SNRs (i.e., low modulation and coding rates), this estimation may be unreliable, so if this method is used a default NCP length might need to be used for low modulation and coding rates (e.g., a default value is used when BPSK modulation is used, and an adaptive NCP length is used for QPSK modulation and higher). Alternatively a signaling method for the NCP length could be used if the modulation and coding rate is at a certain level (e.g., for BPSK modulation).

In some embodiments, the NCP length may be refined on a subframe-by-subframe basis. For example, by examining the amount of inter-block interference (i.e., how much interference is seen from the previous block (slot) of $N_{SC}$ symbols). If that amount of interference exceeds some threshold (which may be modulation and coding rate specific as lower modulation and coding rates can tolerate more inter-block (inter-slot) interference), then the NCP length would be increased. If the inter-block interference is below some threshold, then the NCP length would be decreased.

According to some embodiments, a broadcast control or other transmissions destined for many users may use a default NCP length (e.g. a NCP length that is not signaled).

In some embodiments, for MU-MIMO it may be desirable that all UEs which are paired have the same NCP length. In one example, this may be the largest NCP length between the UEs. One reason to have the same NCP length would be if the UEs can actively suppress the other users in a frequency-selective manner. In situations where active suppression is not employed, then each UE paired may have their own NCP length.

In some embodiments, UEs which are scheduled in the same downlink subframe are scheduled in time order from the UE with the largest NCP to the UE with the smallest NCP. The reason is that the NCP of the previous UE acts like the NCP for the current UE. Hence, if two UEs are scheduled in adjacent time (NCP blocks) and the first UE has a shorter NCP than the second UE, then some inter-block (inter-slot) interference is likely to occur for the second user where the downlink subframe transitions from the first UE to the second UE. Another option is for a default (large) NCP length to be used whenever there is a transition from one UE to the next within a downlink subframe.

Without in any way limiting the scope, interpretation, or application of the examples appearing below, a technical effect of one or more of the example embodiments disclosed herein is to enable a more spectrally efficient NCP-SC system by adapting the NCP on a per-user basis. Another technical effect of one or more of the example embodiments disclosed herein is LOS users would be able to receive more data as they would need smaller NCPs and non-LOS users could improve the decoding by having longer NCPs. Another technical effect of one or more of the example embodiments disclosed herein is allow this adaptation to be done without changing the overall frame timing.

FIG. 6 is a logic flow diagram for adapting the null cyclic prefix for a frequency-domain null single carrier communication system. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the determination module 150-1 and/or 150-2 may include multiples ones of the blocks in FIG. 6, where each included block is an interconnected means for performing the function in the block. The blocks in FIG. 6 are assumed to be performed by a base station such as eNB 170, e.g., under control of the determination module 150-1 and/or 150-2 at least in part.

Referring to FIG. 6, an example method may comprise: determining, for each of a plurality of user equipments, a null cyclic prefix length for communication in a wireless network using null cyclic prefix single-carrier modulation as indicated by block 600; and communicating with at least one of the user equipments based at least partially on the determined null cyclic prefix length of the at least one user equipment as indicated by block 602.

The method may further comprise transmitting an indication of the determined length of the null cyclic prefix to each of the respective user equipments. The indication of the determined length of the null cyclic prefix may be transmitted via downlink control signaling; and the indication may indicate the length of the null cyclic prefix to be used for uplink transmissions from the given user equipment and/or downlink transmissions to the given user equipment. The method may further comprise: receiving an uplink transmission from a given user equipment, and determining the length of the null cyclic prefix for the given user equipment based on the uplink transmission. Determining the length of the null cyclic prefix for the given user equipment may include estimating a number of zeros in equalized symbols of the uplink transmission. The uplink transmission may be beamformed. Determining the length of the null cyclic prefix may be based on channel estimates of the uplink transmission. The method may further comprise: determining that a transmission is intended for more than one user equipment; and using a pre-determined null cyclic prefix length for the transmission. The transmission may be a broadcast control transmission. The method may further comprise: determining at least two user equipments from the plurality of user equipments are paired for multi-user multiple-input and multiple-output (MU-MIMO) communication, wherein determining the length of the null cyclic prefix may include determining a same null cyclic prefix length for the at least two user equipments. The same null cyclic prefix length for the at least two user equipments may be the longer of the null cyclic prefix lengths of each of the user equipments. The method may further include scheduling at least two of the user equipments in time order from largest null cyclic prefix length to smallest null cyclic prefix length, wherein the at least two user equipments are scheduled in a same downlink subframe. The method may further include: changing the null cyclic prefix length for at least one of the user equipments for a subsequent subframe based on an amount of inter-block interference of at least one previous subframe, wherein: the null cyclic prefix length may be increased if the amount of interference exceeds a threshold; and the null cyclic prefix length may be decreased if the amount of interference is below the threshold.

According to another example embodiment, an example apparatus comprises: at least one processor; and at least one memory including computer program code, the at least one memory and the computer program code configured to, with the at least one processor, cause the apparatus to perform at least the following: determine, for each of a plurality of user equipments, a null cyclic prefix length for communication in a wireless network using null cyclic prefix single-carrier modulation; and communicate with at least one of the user equipments based at least partially on the determined null cyclic prefix length of the at least one user equipment.

The at least one memory and the computer program code may be configured to, with the at least one processor, cause the apparatus to perform at least the following: transmit an indication of the determined length of the null cyclic prefix to each of the respective user equipments. The indication of the determined length of the null cyclic prefix may be transmitted via downlink control signaling; and wherein the indication may indicate the length of the null cyclic prefix to be used for uplink transmissions from the given user equipment and/or downlink transmissions to the given user equipment. The at least one memory and the computer program code may be configured to, with the at least one processor, cause the apparatus to perform at least the following: receiving an uplink transmission from a given user equipment, and determining the length of the null cyclic prefix for the given user equipment based on the uplink transmission. The determination of the length of the null cyclic prefix for the given user equipment comprises estimation of a number of zeros in equalized symbols of the uplink transmission. The uplink transmission may be beamformed. The determination of the length of the null cyclic prefix may be based on channel estimates of the uplink transmission. The at least one memory and the computer program code may be configured to, with the at least one processor, cause the apparatus to perform at least the following: determine that a transmission is intended for more than one user equipment; and use a pre-determined null cyclic prefix length for the transmission. The transmission may be a broadcast control transmission. The at least one memory and the computer program code may be configured to, with the at least one processor, cause the apparatus to perform at least the following: determine at least two user equipments from the plurality of user equipments are paired for multi-user multiple-input and multiple-output (MU-MIMO) communication, wherein determining the length of the null cyclic prefix comprises determining a same null cyclic prefix length for the at least two user equipments. The same null cyclic prefix length for the at least two user equipments may be the longer of the null cyclic prefix lengths of each of the user equipments. The at least one memory and the computer program code may be configured to, with the at least one processor, cause the apparatus to perform at least the following: schedule at least two of the user equipments in time order from largest null cyclic prefix length to smallest null cyclic prefix length, wherein the at least two user equipments are scheduled in a same downlink subframe. The at least one memory and the computer program code may be configured to, with the at least one processor, cause the apparatus to perform at least the following: change the null cyclic prefix length for at least one of the user equipments for a subsequent subframe based on an amount of inter-block interference of at least one previous subframe, wherein: the null cyclic prefix length may be increased if the amount of interference exceeds a threshold; and the null cyclic prefix length may be decreased if the amount of interference is below the threshold.

According to another example embodiment, an apparatus may comprise: means for determining, for each of a plurality of user equipments, a null cyclic prefix length for communication in a wireless network using null cyclic prefix single-carrier modulation; and means for communicating with at least one of the user equipments based at least partially on the determined null cyclic prefix length of the at least one user equipment.

FIG. 7 is a logic flow diagram for adapting the null cyclic prefix for a frequency-domain null single carrier communication system. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, determination module 140-1 and/or 140-2 may include multiples ones of the blocks in FIG. 7, where each included block is an interconnected means for performing the function in the block. The blocks in FIG. 7 are assumed to be performed by the UE 110, e.g., under control of the determination module 140-1 and/or 140-2 at least in part.

Referring to FIG. 7, an example method may comprise: determining, by a user equipment, a null cyclic prefix length for communication in a wireless network utilizing null cyclic prefix single-carrier modulation as indicated by block 700; and communicating with an access point of the wireless network, based at least partially on the determined null cyclic prefix length of the at least one user equipment as indicated by block 702.

The method may comprise transmitting, to the access point via uplink control signaling, an indication of the determined null cyclic prefix length to be used for uplink and downlink transmissions for the user equipment, wherein the communicating is performed without prior confirmation from the access point of the determined null cyclic prefix length. Determining the null cyclic prefix length may be based at least on a downlink transmission from the access point. The downlink transmission may be beamformed to the user equipment. The null cyclic prefix length may be determined based on channel estimates determined from the downlink transmission. The method may comprise determining the null cyclic prefix length based on an estimate of a number of zeros in post-equalized symbols of the downlink transmission.

In another embodiment an example apparatus may comprise: at least one processor; and at least one memory including computer program code, the at least one memory and the computer program code configured to, with the at least one processor, cause the apparatus to perform at least the following: determine, by a user equipment, a null cyclic prefix length for communication in a wireless network utilizing null cyclic prefix single-carrier modulation; and communicate with an access point of the wireless network, based at least partially on the determined null cyclic prefix length of the at least one user equipment.

The at least one memory and the computer program code may be configured to, with the at least one processor, cause the apparatus to perform at least the following: transmit, to the access point via uplink control signaling, an indication of the determined null cyclic prefix length to be used for uplink and downlink transmissions for the user equipment, wherein the communicating is performed without prior confirmation from the access point of the determined null cyclic prefix length. The determination of the null cyclic prefix length may be based at least on a downlink transmission from the access point. The downlink transmission may be beamformed to the user equipment. The null cyclic prefix length may be determined based on channel estimates determined from the downlink transmission. The at least one memory and the computer program code may be configured to, with the at least one processor, cause the apparatus to perform at least the following: determine the null cyclic prefix length based on an estimate of a number of zeros in post-equalized symbols of the downlink transmission.

According to another example embodiment, an apparatus may comprise: means for determining, by a user equipment, a null cyclic prefix length for communication in a wireless network utilizing null cyclic prefix single-carrier modulation; and means for communicating with an access point of the wireless network, based at least partially on the determined null cyclic prefix length of the at least one user equipment.

According to another embodiment, a base station or access point may comprise any one of the non-user-equipment apparatuuses described above.

According to another embodiment, a user equipment may comprise any one of the user-equipment apparatuses described above.

According to another embodiment, a communication system may comprise any one of the non-user-equipment apparatuses described above and any one of the user-equipment apparatuses described above.

According to another embodiment, a computer program may comprise program code for executing any one of the methods described above for a user equipment or any one of the methods described above for a base station or access point. The computer program may be a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of a computer described and depicted, e.g., in FIG. 3. A computer-readable medium may comprise a computer-readable storage medium (e.g., memories 216, 226, 246 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eNB (or eNodeB) evolved Node B (e.g., an LTE base station)
ADC analog to digital converter
AESA analog electrically steered array
AP access point
BPSK binary phase shift keying
BW bandwidth
CoMP coordinated multi-point
CP cyclic prefix
DAC digital to analog converter
DFT discrete Fourier transform
FFT fast Fourier transform
IFFT inverse FFT
I/F interface
LOS line of sight
LTE long term evolution
MIMO multiple-input multiple-output
mmWave millimeter wave
MMSE minimum mean squared error
MME mobility management entity ML maximum likelihood
N/W network
NCE network control element
NCP-SC null cyclic prefix single carrier
OFDM orthogonal frequency division multiplexing
PA power amplifier
PAPR peak to average power ratio
QAM quadrature amplitude modulation
RRH remote radio head
Rx receiver
SC single carrier
SGW serving gateway
SRRC square root raised cosine
Tx transmitter
UE user equipment (e.g., a wireless, typically mobile device)
ZT-DFT-S-OFDM zero-tail DFT spread OFDM

What is claimed is:

1. A method comprising:
   receiving, from each of a plurality of user equipments, an uplink transmission;
   determining, for each of the plurality of user equipments, an optimal null cyclic prefix length for communication in a wireless network using null cyclic prefix single-carrier modulation based on the uplink transmission, wherein determining comprises estimating a number of zeros in equalized symbols of the uplink transmission; and
   communicating with at least one of the plurality of user equipments based at least partially on the null cyclic prefix length determined for the at least one of the plurality of user equipments.

2. The method as claimed in claim 1, further comprising:
   transmitting an indication of the null cyclic prefix length to determined for each of the plurality of user equipments to each respective user equipment.

3. The method as claimed in claim 2, wherein the indication of the null cyclic prefix length determined for each of the plurality of user equipments is transmitted via downlink control signaling; and
   wherein the indicates includes the null cyclic prefix length to be used for uplink transmissions from each respective user equipment and/or downlink transmissions to each respective user equipment.

4. The method of as claimed in claim 1, wherein at least one of the following is applicable:
   the uplink transmission is beamformed; and
   determining the null cyclic prefix length is based on channel estimates of the uplink transmission.

5. The method as claimed in claim 1, further comprising:
   determining that a transmission is intended for more than one user equipment; and
   using a pre-determined null cyclic prefix length for the transmission.

6. The method of as claimed in claim 5, wherein the transmission is a broadcast control transmission.

7. The method as claimed in claim 1, further comprising:
   determining that at least two user equipments from the plurality of user equipments are paired for multi-user multiple-input multiple-output (MU-MIMO) communication, wherein determining the null cyclic prefix length comprises determining a same null cyclic prefix length for the at least two user equipments.

8. The method as claimed in claim 7, wherein the same null cyclic prefix length for the at least two user equipments is longer than a null cyclic prefix length used for each of the other user equipments in the plurality of user equipments.

9. The method as claimed in claim 1, further comprising:
   scheduling at least two of the user equipments in time order from largest null cyclic prefix length to smallest null cyclic prefix length, wherein the at least two user equipments are scheduled in a same downlink subframe.

10. The method of as claimed in claim 1, further comprising:
    changing the null cyclic prefix length for at least one of the plurality of user equipments for a subsequent subframe based on an amount of inter-block interference of at least one previous subframe, wherein:
    the null cyclic prefix length is increased if the amount of interference exceeds a threshold; and
    the null cyclic prefix length is decreased if the amount of interference is below the threshold.

11. A method comprising:
    receiving, from an access point, a downlink transmission;
    determining, by a user equipment, an optimal null cyclic prefix length for communication in a wireless network using null cyclic prefix single-carrier modulation based on the downlink transmission, wherein determining comprises estimating a number of zeros in equalized symbols of the downlink transmission; and
    communicating, by the user equipment, with an access point of the wireless network based at least partially on the determined null cyclic prefix length.

12. The method as claimed in claim 11, further comprising:
    transmitting, to the access point via uplink control signaling, an indication of the null cyclic prefix length determined for uplink and downlink transmissions for the user equipment, wherein the communicating is performed without prior confirmation from the access point of the null cyclic prefix length determined by the user equipment.

13. The method as claimed in claim 11, wherein at least one of the following is applicable: the downlink transmission is beamformed to the user equipment; and the null cyclic prefix length is determined based on channel estimates determined from the downlink transmission.

14. An apparatus comprising:
    at least one processor; and
    at least one memory including computer program code,
    the at least one memory and the computer program code configured, with the at least one processor, to cause the apparatus to:
    receive, from each of a plurality of user equipments, an uplink transmission;
    determine, for each of the plurality of user equipments, an optimal null cyclic prefix length for communication in a wireless network using null cyclic prefix single-carrier modulation based on the uplink transmission, wherein determining comprises estimating a number of zeros in equalized symbols of the uplink transmission; and
    communicate with at least one of the plurality of user equipments based at least partially on the null cyclic prefix length determined for the at least one of the plurality of user equipments.

15. The apparatus as claimed in claim 14, wherein the at least one memory and the computer program code are further configured, with the at least one processor, to cause the apparatus to:
    transmit an indication of the null cyclic prefix length determined for each of the plurality of user equipments to each respective user equipment.

16. An apparatus comprising:
at least one processor; and
at least one memory including computer program code, the at least one memory and the computer program code configured, with the at least one processor, to cause the apparatus to:
receive, from an access point, a downlink transmission;
determine an optimal null cyclic prefix length for communication in a wireless network utilizing using null cyclic prefix single-carrier modulation based on the downlink transmission, wherein determining comprises estimating a number of zeros in equalized symbols of the downlink transmission; and
communicate with an access point of the wireless network based at least partially on the determined null cyclic prefix length.

17. The apparatus as claimed in claim 16, wherein the at least one memory and the computer program code are further configured, with the at least one processor, to cause the apparatus to:
transmit, to the access point via uplink control signalling, an indication of the null cyclic prefix length determined for uplink and downlink transmissions, wherein the communicating is performed without prior confirmation from the access point of the determined null cyclic prefix length.

18. A computer program product comprising a non-transitory computer-readable storage medium bearing computer program code embodied therein for use with a computer, the computer program code comprising code executable by the computer to perform the method claimed in claim 1.

19. A computer program product comprising a non-transitory computer-readable storage medium bearing computer program code embodied therein for use with a computer, the computer program code comprising code executable by the computer to perform the method claimed in claim 11.

* * * * *

UNITED STATES PATENT AND TRADEMARK OFFICE
CERTIFICATE OF CORRECTION

PATENT NO. : 10,911,280 B2
APPLICATION NO. : 16/337533
DATED : February 2, 2021
INVENTOR(S) : Thomas et al.

Page 1 of 1

It is certified that error appears in the above-identified patent and that said Letters Patent is hereby corrected as shown below:

In the Claims

In Claim 2
Column 15, Line 35, "to" should be deleted.

In Claim 3
Column 15, Line 41, "indicates" should be deleted and --indication-- should be inserted.

In Claim 4
Column 15, Line 45, "of" should be deleted.

In Claim 6
Column 15, Line 55, "of" should be deleted.

In Claim 10
Column 16, Line 7, "of" should be deleted.

In Claim 16
Column 17, Line 9, "utilizing" should be deleted.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*